June 30, 1936. A. W. GRAY 2,046,068
DEVICE FOR MEASURING MATERIALS
Filed April 24, 1934
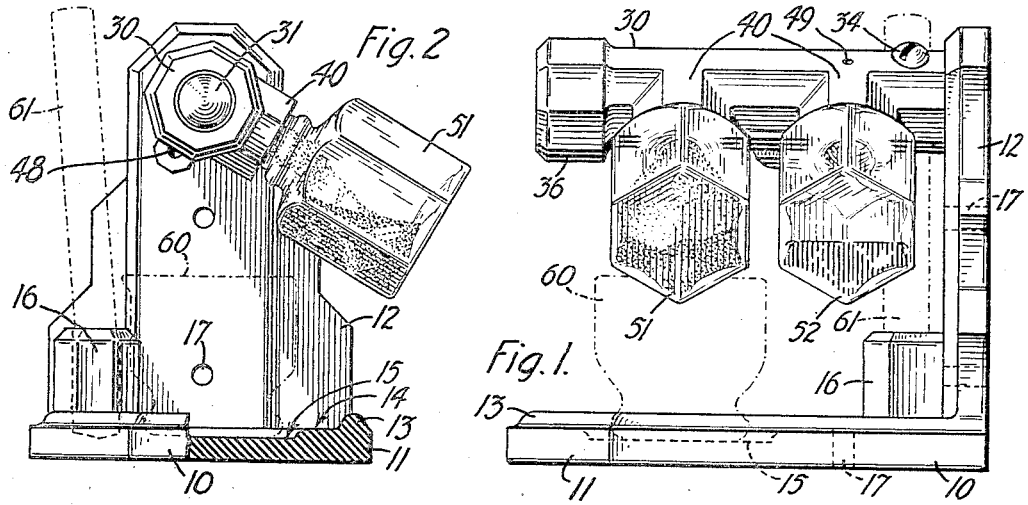
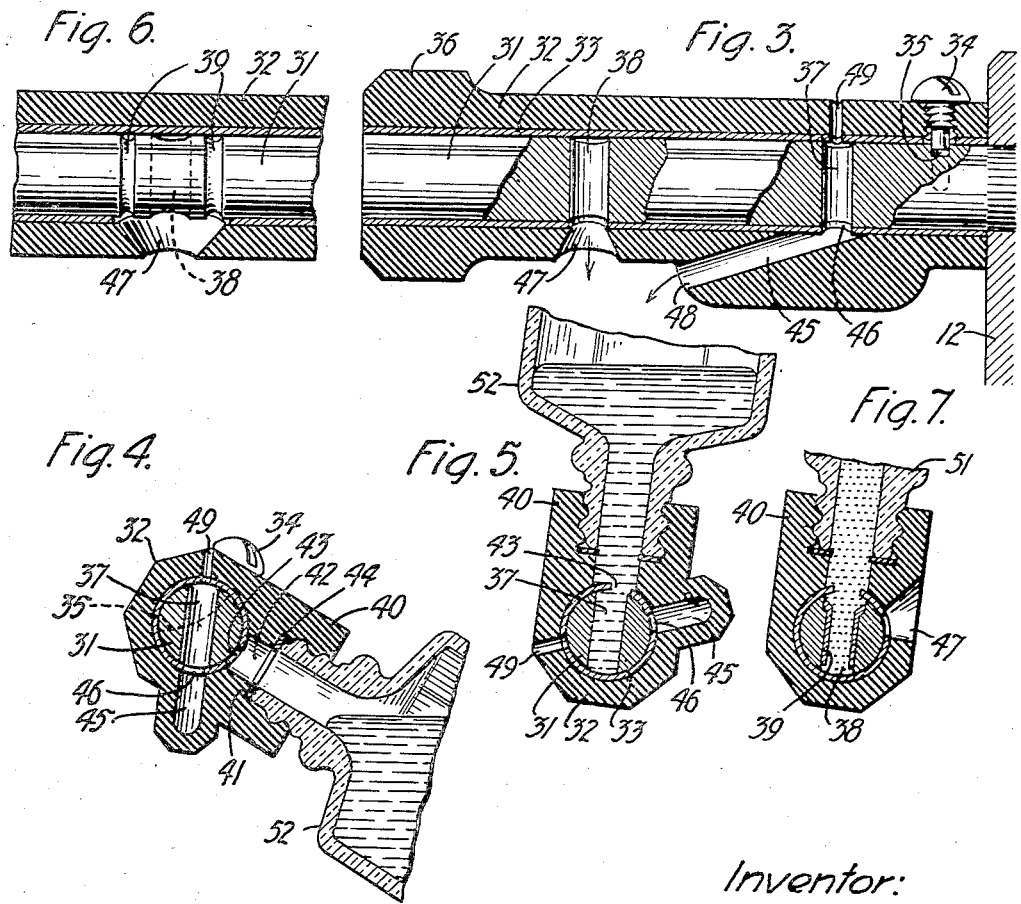
Inventor:
Arthur W. Gray
by O. U. Rasmussen, Atty.

Patented June 30, 1936

2,046,068

UNITED STATES PATENT OFFICE 2,046,068

DEVICE FOR MEASURING MATERIALS

Arthur W. Gray, East Orange, N. J.

Application April 24, 1934, Serial No. 722,125
In Great Britain March 3, 1934

13 Claims. (Cl. 221—98)

This invention relates to improvements in devices for measuring materials and more particularly to devices of this type for the simultaneous apportionment by volume of a plurality of different materials in predetermined ratios.

Devices of this type have a multitude of applications; they may be designed for large quantities of materials or for very small quantities which must be measured with considerable accuracy; they may be used for only two materials or for a great plurality of materials, which may be in liquid, powder or granular form, and the ratios of one measured volume to another may vary over a large range.

The invention is applicable to any and all of these variations of measuring devices.

An object of the invention is to provide a device by which a plurality of materials, solid or liquid, may be quickly and accurately measured from their supply containers and discharged into any convenient receptacle or receptacles as for mixing.

Another object is to provide a device of this type with which the desired measuring functions are accomplished simultaneously for a plurality of materials by a single operation, as from rest position to measuring position and back to rest position.

A further object is a device in which the chance of contamination of any one supply from adjacent supplies is reduced to be practically eliminated.

Another object is a device for this purpose in which the tendency of the materials to segregate each within its container into constituents of different characteristics, such as coarseness of powders, due to vibrations of the device during its operation, is effectively counteracted.

A still further object is a device which will require little or no cleaning, which may be operated as well as refilled with no waste of materials.

A further object is a device of this type which may be made with mechanical precision to insure most or all of the aforementioned objects and which still will be capable of discharging full measures of materials, the danger of interference with the passing of materials through the device due to presence or absence of air being practically eliminated.

Among the more specific objects are simplicity of construction as by avoidance of springs and reduction of the number of parts; instantaneous and easy operation, as by a to-and-fro movement with one hand by an operator; visibility of the material content at all times as a guard against false proportioning; simple and quick refilling of supply materials; etc.

Thus in accordance with certain general features of the invention the measuring device comprises a plurality of material containers mounted on a valve structure with a stationary measuring member acting as a pivot for the containers to swing about from a normal, or rest, position in a downward direction to an upper measuring position, for simultaneous pouring of the materials from the containers into individual measuring compartments in the valve structure, and back again to the normal position for discharging of the measured quantities from the valve structure out of contact with the supply materials.

In accordance with other features of the invention there is provided a valve mechanism for each container, which mechanisms simultaneously, during the movements of the containers, open and close automatically and in proper sequence the measuring compartments for filling them with materials, cutting them off from the supplies, and discharging the materials from the measuring chambers, the direction of movements being substantially at right angle to the plane in which the containers are lined up.

In accordance with still other features of the invention the containers are in the form of bottles, which may be of glass, and the moveable part of the valve structure is adapted for ready reception or detachment of the necks of the bottles which will fit closely to the passage through the corresponding valve mechanism, so that the materials in the bottles may flow by gravity into the measuring compartments in the upper, upturned position of the bottles and without any waste.

This application is a continuation in part of my application Serial No. 683,461 filed on August 3, 1933.

The invention will now be described in its preferred form, in which it is particularly suitable for apportionment of dental filling materials, such as the powdered or granulated alloy and mercury commonly mixed in certain proportions for the filling of teeth.

In the following description reference will be made to the attached drawing in which:

Figs. 1 and 2 are front and side elevations, respectively, of an apportioning device for two materials;

Fig. 3 is a longitudinal cross-sectional view of the two-unit valve mechanism;

Figs. 4 and 5 are transverse cross-sectional views through one valve unit, showing the device in normal and in operated positions, respectively;

Fig. 6 is a longitudinal cross-sectional view of one valve unit showing a modification of those shown in Fig. 3; and Fig. 7 is a transverse cross-sectional view through one valve unit in operated position showing a modification of those shown in Fig. 3.

The measuring device comprises a stand 10 with a base 11 and an upright 12, which may be shaped in any manner to suit appearance and convenience in the placing of a receptacle for the measured materials.

The device further comprises the valve structure 30 having a stationary member or stem 31 fixedly attached to the upright 12 and the valve housing or barrel 32 turnable about the stem into two positions.

The device further comprises the containers or bottles 51 and 52 for alloy and mercury respectively, attached by screw threads about their necks to the valve housing 32 for movement therewith.

The valve stem or plug 31 is preferably of steel of such composition that its surface will not be attacked by the materials to be measured, and it is in the form of a cylindrical rod, one end of which may be knurled and driven into a hole in the upright 12 to remain in fixed position for the operation of the device. The surface of the rod is trued and ground to a snug fit with the inside surface of the valve housing to reduce creepage of the measured material between the two surfaces. The valve housing or cylinder 32 is substantially in the form of a hollow cylinder surrounding the whole length of the overhanging valve stem 31. It is preferably formed of a plastic material, such as bakelite, and may have its bore fitting directly on to the stem; however, it is preferable to line the inside of the housing or barrel with a thin tube 33 of steel or other suitable metal to reduce wear and to permit working into a better fit. This lining may be inserted during the molding of the valve barrel to form a unit therewith without any chance of slippage during the operations of the device. The metal of this tube should not be subject to chemical reaction with the measured materials. At a convenient place a stop screw 34 is screwed into the barrel and has its reduced end projecting into a slot or groove 35 cut transversely in the surface of the stem 31. This permits a predetermined angular movement of the barrel 32 about the stem 31 and also serves to fix the barrel on the stem in the axial direction. A knob or handle 36 may be formed at the free end of the valve cylinder as an integral part thereof for manual operation of the device.

In the preferred form the valve structure has two measuring units, but the number of these may of course be increased as desired. These units each include a container, such as 51 and 52, for the materials to be measured which individually may be of different forms or materials and therefore may require different arrangements for attachment to the valve barrel. However, in the construction illustrated in the drawing the containers 51 and 52 are of identical design, and are in the form of glass bottles with a neck, threaded on the outside. These bottles are of standardized design and may be stocked by the dentist filled with mercury and alloy, respectively, for which purposes they may be provided with an easily removable screw cap, not shown.

The measuring units further each comprise a valve unit forming an integral part of the valve structure 30 and including means for fastening the container. These units are identical in design and operation, and differ merely in the dimensions of the measuring compartments in accordance with the ratio of the materials required for the filling amalgamation.

Thus referring to the unit shown to the right in Figs. 1 and 3 and shown in cross-section in Figs. 4 and 5, the bottle 52, containing mercury, is screwed into the threaded boss or projection 40 on the valve barrel 32 with the end of the neck tight against the shoulder 41 and the neck opening registering with the passage 42 through the valve cylinder and passage 43 through the steel lining 33; if desired a shim or washer 44 may be provided to prevent leakage between the bottle neck and shoulder 41.

With the bottles 51 and 52 screwed in position their weight will tend to turn the whole barrel 32 so that they will hang straight downward; however the slot 35 and stopscrew 34 provide a stop for this movement leaving the bottles at an angle with the vertical, which may be about 60° for practical purposes as shown in Figs. 2 and 4. In this rest position the material will have fallen back into the bottle and the passages 42 and 43 are closed by the valve stem 31. This angle as well as the spacing between the units permits easy replacement of the bottles when the device is in rest position without danger of spilling any of their contents.

The mercury unit further comprises a measuring compartment or cavity in the stationary stem or plug 31. In the preferred form the compartment consists of a hole or passage 37 running transversely through the stem in a direction which may be vertical or nearly so, and placed in alignment with the mercury container for registry between its upper opening and the opening 43 when, for measuring purposes, the bottles are swung to their upper position as shown in Fig. 5. Proper alignment in this position is secured by engagement of the stopscrew 34 with the end and sides of slot 35. As shown in Fig. 5 the passage 37 forms a continuation of the path formed by the openings through the valve barrel and the neck of the bottle 52, which, in this position of the barrel, is closed at the bottom by the barrel or its inside lining, so that these passages will fill up completely with mercury without any loss.

The measuring passage 37 for the mercury will usually be dimensioned to hold a smaller volume than the similar passage 38 for the powdered alloy, so that the device by a single operation will deliver quantities of the two materials which will be exactly in the correct proportions desired for the amalgamation. For the purpose of enabling the dentist to vary the ratio of alloy to mercury the measuring passage for either or both may be slightly modified for the insertion of a bushing 55 as shown in Fig. 7 for the alloy passage 38 to reduce the measured volume for a different ratio. The operations required for this insertion involve merely loosening the stop screw 34, sliding the valve cylinder partway off the stem, inserting the bushing and restoring the cylinder and stop screw.

For completion through the device of the passages for the materials each valve unit further comprises a discharge passage formed, as shown for the mercury unit in Figs. 3 and 4 and 5, by an opening 45 through the valve cylinder 32 and an opening 46 through the lining 33. As shown in Fig. 5 this passage is out of register with the measuring chamber 37 when the valve mechanism is in its upper position for filling of the chamber. The angular relation of this discharge passage to the filling passage 42 is such that the chamber 37 will remain closed at the bottom until, during the return movement of the valve barrel from the position in Fig. 5 to the rest position in Fig. 4, the cut-off edge of the hole 43 has completely separated the content of the chamber 37 from the supply material and thereby confined a definite, desired quantity of material within the chamber; when the normal position is reached, the discharge passage 45, 46 will be in registry with the chamber 37 thereby automatically causing the discharge of the measured quantity of material into the receptacle 60. Depending on the angle at which the holes 37 and 38 are set the angle between the filling and the discharging passages in the cylinder may be about 60° to 90°.

In order to insure a quick and complete discharge of the mercury from the measuring chamber 37 a small hole 49 through the valve barrel 32 and the lining 33 opposite the passage 46 serves to admit air above the mercury in chamber 37 in the discharge position. This air vent or any similar arrangement makes it possible to provide a very snug fit between the relatively movable parts. To further insure accuracy it is convenient to arrange in some manner for a slight non-alignment either in the axial direction or angularly between the measuring chamber 37 and the charging passage through the valve barrel for the mercury unit in order to completely prevent that a volume of air become confined in the chamber 37 when it is being filled. Thus by placing the hole 43 so that it will be eccentric with respect to the upper opening of chamber 37 in filling position, as shown in Fig. 5, the mercury will flow along one side of the chamber 37 and permit air to rise along the other side.

It is usually convenient that the materials should discharge into a small mortar 60, for which reason the discharge passages are made to converge and deposit their materials safely within the rim of the mortar. Whereas the discharge passage 47 for the powdered alloy preferably is as short and vertical as possible to prevent clogging, the discharge passage 45 for the mercury may have a decided slope, as shown in Fig. 3, without danger of clogging, thus permitting its lower discharge opening 48 to be close to the opening 47 for the alloy. The openings 47 and 48 may, of course, be united into a single spout if desired, and it is also possible to provide a stationary trough or funnel for guiding the discharges from openings directly below the two valve units into the mortar, without a departure from the invention.

Since the movements of the valve barrel are at right angle to the valve stem it is evident that there will be very little creepage of material lengthwise of the stem and that therefore there is little chance of contamination of one material by the other on this account. As a further safeguard against such creepage, which might result in a continuous packing, say of the finer grains of the alloy powder, between the stem 31 and lining 33 and make operation difficult the device may be modified, as shown in Fig. 6, by the provision of a small annular groove or channel 39 on either or both sides of the measuring chamber 38. The particles which may have found their way along the stem to these grooves will find an easy passage downward and discharge through the discharge passage 47 into the mortar, the discharge passage 47 in this instance being properly funnel shaped to reach all three discharge points on the stem.

The construction of the base 11 is such that mortars of different sizes may be used and their proper centering for receiving the discharges facilitated. Thus the base has an edge 13 raised from the main surface 14 and serving to limit the placing of the larger size mortars which would stand on the surface 14. Mortars, which are too small to be centered in this manner, will set in the depression 15 which further limits the sideways displacement. A convenient receptacle 16 is provided for placing of the pestle 61 when not in use. Holes 17 are provided in the base 11 as well as in the upright 12 for screws to fasten the device either on a vertical or a horizontal surface, as desired.

In the operation of the device the dentist can readily observe whether there is sufficient supplies of materials in the transparent, visibly arranged containers, and thus be certain that he will receive the proper mixture. The mortar, upon cleaning, is readily centered on the base. The device is then manipulated by turning the knob, at the end of the valve structure, until the bottles come to a stop, due to the stop screw, in an upturned position. By this turning over of the bottles each time the device is used the dentist is assured of always having a uniform distribution of fine and coarse grains in his alloy. After a moment's wait he turns the knob back again and thereby returns the device, which comes naturally to rest with the bottles in a downward position, as again determined by the stop screw. At this moment the device discharges the measured quantities of alloy and mercury simultaneously into the mortar, which together with the pestle now may be removed for preparation of the amalgam. When a container becomes empty it is simply unscrewed in the downward position, and a new full container taken from the stock and screwed in without the need of filling funnels or cleaning of threads.

The necessity for cleaning the valve structure inside is practically totally eliminated by the provisions of the invention. However, in case the need should arise it is only necessary to unscrew the two containers and loosen the stop screw sufficiently to permit the valve barrel to slide off the stem; all parts thereby become accessible for cleaning.

The device lends itself to numerous modifications which would be within the scope of the invention. Thus the discharges may be made consecutive instead of simultaneous by angular displacement of the discharge openings. The containers need not be placed in angular alignment, but may be placed at about right angles to each other so that one measuring chamber would be filled in the position in which the other chamber would be discharged; or the containers may be fastened at diametrically opposite points of the device with the consequence that the device either would have double movement for bringing first one side into operation and then the other, or else would deliver a measure from each container by being given one complete turn.

It should further be understood that the stem of the valve mechanism may be held fixed against rotation by any conventional means besides a stand, the principal objects of the mounting being to avoid the awkwardness of holding the device in the hand while operating it and to insure accuracy by fixing the angular positions of the passages with respect to the vertical.

What is claimed is:

1. A rotary measuring valve mechanism adapted to be mounted on a support and having a stationary and a rotatable member and a container for material to be measured by the operation of said valve mechanism, said container being attached to said rotatable member, said stationary member having a measuring chamber for said material and said rotatable member being normally in one position with said container extending in a substantially downward direction and being rotatable for each measuring operation into another position with said container extending in a substantially upward position for filling of said chamber.

2. A two position valve mechanism comprising a stationary member having a plurality of measuring chambers and a movable member having passages for said chambers, mounting means for said members, a plurality of containers for materials to be measured attached to said movable member for movement therewith into two positions, said passages being adapted for filling of said chambers from said containers in one position of said movable member, and said containers being attached to hold by their weight said movable member in the other position for discharge of said chambers.

3. A measuring device for comminuted material comprising a stationary measuring compartment, and shutter means therefor mounted to be movable in each measuring operation about a substantially horizontal axis from a position for filling to a position for discharging said compartment, a container for a supply of said material fastened to said shutter means to move therewith about said axis, the angle of movement between said positions being such that said container becomes upturned sufficiently for mixing of dissimilar constituents of its contents.

4. A measuring device fastened on a support and comprising a valve mechanism having a stationary measuring chamber and movable shutter means for the filling and discharging of said chamber in two positions respectively, a container for material to be measured having an opening and a closed bottom, said shutter means having means for attachment of said container without spilling of its contents when said shutter means is in said discharging position, and said container being in position with bottom up for supplying material to said chamber when said shutter means is in filling position.

5. A material apportioning device comprising a substantially cylindrical multiple valve mechanism having measuring chambers and movable shutter means, mounting means therefor, a plurality of material containers detachably screwed into said shutter means to extend radially therefrom and to be substantially in straight alignment along said cylindrical mechanism for simultaneous movement with said shutter means for the measuring operation, said containers being in a downward, gravity held position when said shutter means is in position for the discharge of measured materials from said valve mechanism, and said shutter means having a stop for stopping said containers in an upturned position for filling of said measuring chambers.

6. A material apportioning device comprising a bracketlike support, a valve stem fastened to said support and having a plurality of substantially parallel, transverse measuring passages, a multiple valve barrel turnable about said stem into filling and discharging positions, a plurality of material containers detachably mounted on said barrel each for registry with one of said measuring passages, to move with said barrel into position for pouring material into said measuring passages and into a gravity held downward position during emptying of said measuring passages, said valve barrel having for each of said measuring passages a filling passage for guiding and completely enclosing the material during pouring into said measuring passage, an upper shutter portion for separating the material in said measuring passage from said filling passage in the said discharging position, and a lower shutter portion for opening said measuring passage for emptying thereof in the discharging position, and stop means for carrying the weight of said containers to fix the downward position of said containers at an angle such that they may be attached to said barrel without spilling of their content.

7. A material measuring device comprising a plurality of containers for materials to be measured each having an opening, a stationary measuring member having a substantially vertical measuring passage for each of said containers, a movable fixture for said member having openings and surface portions for said passages for control of the filling of the passages at the top, for cutting-off material from said containers and for subsequently discharging said passages from the bottom by a movement of said fixture relative to said passages, said fixture having means for mounting of said containers substantially aligned in a plane for movement with said fixture in a direction substantially perpendicular to said plane.

8. A material measuring device in accordance with claim 7 in which the opening in said fixture for filling of one of said passages at the top is located to admit material along one side of said passage to prevent trapping of air in said passage by the admitted material.

9. A material measuring device in accordance with claim 7, in which at least one of said passages contains a gravity held volume reducing insert.

10. A two position, rotary measuring valve mechanism for delivering accurate quantities of comminuted or liquid materials from a supply container which comprises a stationary valve stem with a measuring chamber forming a substantially vertical through passage, a movable shutter unit having surface portions and openings for closing said chamber at the bottom and associating it with the supply container at the top for filling in one position, and opening said chamber at both the top and the bottom for discharging in the other position.

11. An alloy-mercury gauge for dental use comprising a valve mechanism and a supporting mounting therefor, and an alloy container and a mercury container, said valve mechanism including a stationary valve stem having a measuring passage for each of said containers forming bores through said stem in a substantially vertical direction for through passage of said materials, said valve mechanism also including a shutter fixture rotatably mounted on said stem and adapted for the attachment of said containers for movement therewith as a unit in each measuring operation, and stop means for fixing the filling position and the discharging position of said fixture with respect to said passages, said shutter fixture forming tight enclosures for said stem at each of said passages and having a supply passage from the alloy container and a supply passage from the mercury container for filling of said measuring passages at the top in filling position, said supply and measuring passages for the mercury container being eccentrically aligned to admit mercury along one side of said measuring passage, said shutter fixture being further adapted to open for the bottom of said measuring passages in the discharge position and having an air inlet aligned with the top of the measuring passage for the mercury in the discharge position to admit air behind the mercury and said containers being aligned and spaced apart in a plane substantially perpendicular to the direction of their movements.

12. A material apportioning device comprising a stand with an upright member and a base plate to receive receptacles for the measured materials, an oblong two position valve structure having a movable member and a stationary member fastened to said upright to overhang said base plate and having a plurality of measuring valves with converging discharge openings on the side towards said base plate, a plurality of bottle-like containers for supply materials each screwed with its neck into said movable member to move therewith to supply material to one of said valves in the measuring position of said structure and to be at rest at an oblique downward angle in the normal position of said structure, said valve structure having manipulating means for manual operation with the said containers as one unit between said two positions, and having stopping means for said movable member to limit its movements to be between said two positions.

13. A material apportioning device in accordance with claim 12, in which said base plate has a main surface, a ridge along its edge for centering of large receptacles on said surface and a depression in said surface inside said ridge for centering of small receptacles below said converging discharge openings.

ARTHUR W. GRAY.